(12) United States Patent
Lee (10) Patent No.: US 6,295,786 B1
(45) Date of Patent: Oct. 2, 2001

(54) BUILDING PANEL AND METHOD OF FORMING SAME

(76) Inventor: John Bartholomew Lee, 133 Akuna Street, Kenmore, QLD 4069 (AU)

( * ) Notice: Subject to any disclaimer, the term of this patent is extended or adjusted under 35 U.S.C. 154(b) by 0 days.

(21) Appl. No.: 09/500,525

(22) Filed: Feb. 9, 2000

Related U.S. Application Data

(63) Continuation of application No. PCT/AU98/00650, filed on Aug. 11, 1998.

(30) Foreign Application Priority Data

Aug. 11, 1997 (AU) .................................................. PO8514

(51) Int. Cl.[7] .................................................. E04C 2/296
(52) U.S. Cl. ........................ 52/745.19; 52/71; 52/309.9; 52/783.17; 52/794.1
(58) Field of Search ...................... 52/309.9, 71, 783.17, 52/745.19, 794.1; 428/121

(56) References Cited

U.S. PATENT DOCUMENTS

| 3,874,980 | 4/1975 | Richards et al. |
|---|---|---|
| 3,909,995 | 10/1975 | Bainter et al. |
| 4,024,684 | 5/1977 | Holmgren . |
| 4,091,142 * | 5/1978 | Elmore et al. ........................ 428/322 |
| 5,652,039 * | 7/1997 | Tremain et al. ...................... 428/121 |

FOREIGN PATENT DOCUMENTS

| 22532/67 | 12/1968 | (AU) . |
|---|---|---|
| 23166/67 | 12/1968 | (AU) . |
| 40432/68 | 1/1970 | (AU) . |
| 2930887 | 2/1981 | (DE) . |
| 3011528 | 10/1981 | (DE) . |
| 3901237 | 7/1990 | (DE) . |
| 2471116 | 6/1981 | (FR) . |
| 2150495 | 7/1985 | (GB) . |
| 2229135 | 9/1990 | (GB) . |
| 8504922 | 11/1985 | (WO) . |
| 9410406 | 5/1994 | (WO) . |

OTHER PUBLICATIONS

Derwent Abstract No. 90–064072/09 of JP 02–018038 entitled "Interior Trim Composite Panel . . . Impregnated With Resin" to Toyo Rubber Ind. KK, Jan. 1990.

Derwent Abstract No. 91–146287/20 of JP 91–028311 B entitled "Foam Sheet . . . Crosslinking Agent" to Toray Ind. Inc., Apr. 1991.

* cited by examiner

Primary Examiner—Christopher T. Kent
(74) Attorney, Agent, or Firm—Dykema Gossett PLLC (57) ABSTRACT

A building panel (10) including a core body (11) containing a compressible solid, and cladding layer (12), on at least one outer surface of the core body, and wherein the building panel is foldable. Preferably, the core is a polymer foam, and the cladding layer is substantially more rigid than the core body for imparting strength thereto. The fold (26) may be provided by cutting the cladding layer from what will become the inside surface of a fold, and removing sufficient material from the core body to permit the panel to be folded. The cladding layer preferably includes a textile of a flexible fiberglass, nylon or polyester in the form of a woven or non-woven mesh (16) with a resin component (17) in the form of a settable liquid applied to, and set into the interstices of the textile with the resin component substantially encapsulating the textile component.

19 Claims, 8 Drawing Sheets

BUILDING PANEL AND METHOD OF FORMING SAME

This application is a continuation of PCT/AU98/00650, filed Aug. 11, 1998.

This invention relates to a building panel and method of forming same.

This invention has particular application to building panels suitable for offices and commercial premises and for illustrative purposes the building panel of this invention hereinafter will be described in relation to such application. Of course this invention is not limited to such application and it may be used for dwellings, houses and/or factory buildings or warehouses, multi-level apartments or offices, and such like, as well as collapsible furniture, packaging, containers and such like.

Building panels are used in construction to provide walls, floors, ceilings and roofs. Different materials are used according to their respective suitabilities, however, present building panels are generally supported by a framework, such as joists for floors, plates and studs for walls, and battens for ceilings and roofs.

Additionally, offices and commercial premises such as shops and restaurants include awnings or covered areas where it is desirable not to have pillars.

Recently, composite structural panels have been developed using a metal clad onto a core body usually formed from foamed plastics material, such as polystyrene. When such panels are used at a building corner, the panels are cut and joined to form such corners, weakening the completed structure. Additionally, metal cladding is highly conductive of heat, and has a significantly different coefficient of thermal expansion to that of the core body. Thus, such panels are usually used to form flat surfaces, limiting the architectural applications of such panels. Moreover, the metal cladding on such composite panels does not provide a suitable surface finish for many architectural applications.

This invention aims to alleviate at least one of the abovementioned disadvantages and provide a building panel which will be reliable and efficient in use.

This invention in one aspect resides broadly in a building panel including:

core means containing a compressible solid;

cladding means on at least one outer surface of the core means, and wherein the building panel is foldable.

Preferably, the core means includes a core body which is a polystyrene, polyurethane or similar polymer foam, and the cladding means includes a cladding layer which is substantially more rigid than the core body for imparting strength thereto. In an alternative form, the core body may be constructed, for example, from sheets of corrugated cardboard with the corrugations running across the thickness of the panels.

Thus, the building panel may be folded by creasing the core body along the inside corner of the fold, along with the cladding layer on the inside surface if such is provided. The core body is thereby compressed in the area within the fold, and, where the cladding layer is provided on both sides of the core body, the cladding layer on the inner side of the fold may be creased into the fold. Alternatively, the cladding layer may be cut from what will become the inside surface of a fold, and sufficient material removed to permit the panel to be folded.

Preferably, slightly less material is removed from the core body than would be necessary to complete the fold such that at least some of the core body material in the vicinity of the fold is compressed.

Preferably, material forming the core body is removed to form a V-shaped groove or channel about which, or into which, the panel may be folded, closing the groove until the cut edges of the cladding layer meet. Upon causing the cut edges to meet, they may be bonded together to secure the fold. Preferably, the angle of the sides of the groove is shallower then half of the angle of the proposed fold so that the groove is not as deep as the thickness of the core body, and the material near the base of the groove is compressed in performing the folding operation.

Preferably, the surfaces of the core body upon which the cladding layer is to be applied are substantially planar and relatively smooth. However, it will be appreciated that a degree of roughness is desirable on the surface of the core body to facilitate bonding of the cladding layer to the core body. In one embodiment, the surface of the cladding layer may be dimpled, or other specialised surface treatments may be applied, including cutting shallow grooves, or application of a surface bonding or sensitising agent. Of course, the surface of the core material should be substantially clean prior to the application of the cladding layer.

The cladding layer preferably includes a composite material including a textile component and a resin component. For example, the cladding layer may include a flexible fibreglass, nylon, polyester or such like. Preferably, however, the textile component is formed from a mesh of woven or non-woven threads and a resin component is in the form of a settable liquid applied to the surface and set into the interstices between the threads of the woven or non-woven mesh onto both sides of the core body, the resin component substantially encapsulating the textile component. Preferably, the mesh is a relatively open mesh, and the settable liquid adequately wets the surface of the threads.

In a preferred embodiment, the textile sheet is a fibreglass mesh formed into a non-woven square grid pattern of 4 mm or 5 mm and having a density of 165 $g/m^2$ or 150 $g/m^2$ respectively. The settable liquid is preferably a two-part acrylic, and in a preferred embodiment, is comprised of Aegis MSP Waterproof Multi Surface Protector, Aegis Acrylcoat L.B. Low Build Seamless Liquid Membrane, Aegis Acrylcoat H.B. High Build Flexible Texture Coating or Aegis Acrylcoat P.S. Primer and Sealer or any combination of same as supplied by Durus (Aust) Pty Ltd. According to product data sheets dated 1989, Aegis MSP Waterproof Multi-Surface Protector is a two pack product with a first dry mix part consisting of cement (30–50% by weight) and sand. A second, wet mix part consists, by weight, of acrylic polymer (40–60%), residual monomers (trace), ammonia (0.2% max), antifoamer (0.5–5.0%), 1,2-ethanediol (0.1–4.5%); antioxidant (0.1–2.5%) and water (40–60%). In use the wet and dry mixes are mixed in the ratio of 420 ml of wet mix to 6 kg of dry mix in order to form a modified mortar for use as a coating. The dried product is cementitious in appearance. (Aegis and Durus are trade marks.)

In another aspect, this invention resides broadly in a building panel including:

a substantially lightweight core;

cladding means containing an open textile mesh and a resin disposed around and within a plurality of interstices of said mesh, the resin component bonding to the mesh and to the core. The building panel is preferably substantially planar, but it will be appreciated that other forms may be utilised, such as building columns or such like wherein the core means is substantially cylindrical, such as of circular cross-section, or panels having a curved profile in cross-section.

Another preferred form is to provide a flange on each end of the panel such that the panel in cross-section is either in U-form or Z-form whereby the panels may be stood up in end-to-end configuration with adjoining panels being hooked together at their respective flanges. It is preferred that in such an arrangement, a gap be provided between the hooked-in flanges and that the distal edge of each flange is placed in close contact with the adjoining panel. Using such an arrangement, piers may be formed between adjoining panels in the form of a settable liquid such as concrete poured into the longitudinal space between the flanges. Additionally, reinforcing bars may be inserted into the space, or the flanges arranged around reinforcing bars as the panels are erected into position.

The panel of the present invention may also be constructed with webbing means interlinking the cladding layers on the two sides of the core means. The webbing means is preferably constructed by coating one surface of a core body forming the core means with the cladding as herein described, slitting the partially clad panel into strips, turning each of the strips about their respective longitudinal axes through 90°, and then coating both of the exposed surfaces with the cladding. The distance between the webs thus created will be determined by the thickness of the unclad core body, and the thickness of the finished panel will be established by the separation of the parallel cuts forming the strips.

It is preferred that the longitudinal corners of the strips are rounded or chamfered so that when the last two cladding layers are added, the settable liquid fills the channels formed thereby for a stronger bonding between the webs and the cladding layers.

It will be appreciated that further webs may be created, such as on a square pattern, by making a second set of slits at 90° to the first set, or a triangular pattern by making second and third sets of slits, each at 60° to one another.

In another aspect, this invention resides broadly in a hinge connection formed into a building panel as hereinbefore described. Preferably, the building panel is in the form of a panel having cladding layer, the flexibility of the cladding layer being sufficient to permit bending of the panel within its elastic limits. Preferably, the panel is cut with a V-shaped cut to permit bending of the panel. It is also preferred that at least some of the core material is retained adjacent the cladding to be bent so that it may be compressed by the folding action of the panel, the cladding layers being substantially non-stretchable.

This invention is another aspect resides broadly in a method of forming a building panel, the method including:
  providing core means containing a compressible solid;
  forming said core means into a desired configuration;
  setting a woven or non-woven textile sheet onto the surface of the core means;
  applying a settable liquid to the surface of the core means to substantially encapsulate the textile sheet to form a cladding layer on one or both surfaces of the core means.

The method may include applying a coating of settable liquid onto the surface of the core means prior to setting the woven or non-woven textile sheet thereon, and then applying more of the settable liquid.

It is preferred that the cladding layer is foldable. The panel may be folded by the methods described above. Typically, the panel is between 50 mm or 100 mm in thickness, and the V-shaped cut is of a depth of between 10 mm and 20 mm less than the thickness of the panel. The sides of the V-shaped cut are at an angle suitable for the angle of the bend, and the base of the V-shaped cut is preferably rounded so that the straight portions of the sides of the V-shaped cut, when projected through to the other side of the panel, intersect substantially centrally of the material forming the cladding layer on the other side.

The method may further include tacking the textile sheet to the core means and suspending the core means and the textile sheet tacked thereto by the textile sheet. Suitably, the textile sheet is extended above the upper limit of the core means for this purpose.

It is preferred that the mix used to coat the core means is a wet/dry mix. More preferably, the two-part acrylic is preferably provided in a first aqueous coating sprayed onto the core means and textile component, a second coating of powder comprising the second part of the two-part mix. This is preferably followed by a third aqueous coating sprayed onto the second coating in a similar fashion to the first coating, and a fourth coating of powder spread or sprayed onto the third coating in a similar fashion to the second coating.

It is also preferred that the coating is agitated or mixed by providing a mixing pad resting on the surface of the coating with substantially no compressive force, and providing a small diameter orbital action substantially coplanar with the surface of the panel. If the panel is produced continuously, then the orbital action is added to the linear motion of the mixing pad which suitably extends across the width of the panel under manufacture in accordance with the present invention.

In an alternative method, the settable liquid is applied by a doctor blade which includes a leading portion, a delivery portion in the form of an elongate plenum chamber, a trailing portion, and an internal flow guide, and wherein the leading portion is in hinged engagement with the remainder of the doctor blade. The leading portion and delivery portion preferably include a substantially flat land portion, flat in the direction of the plane of the surface upon which the settable liquid is to be applied. The flow guide preferably is in the form of an inwardly curing flange, curved away from the surface, and the trailing portion is clear of the surface by a distance sufficient to produce a thickness of settable liquid upon the surface as required.

In order that this invention may be more readily understood and put into practical effect reference will now be made to the accompanying drawings which illustrate a preferred embodiment of this invention and wherein.

Figure 1:
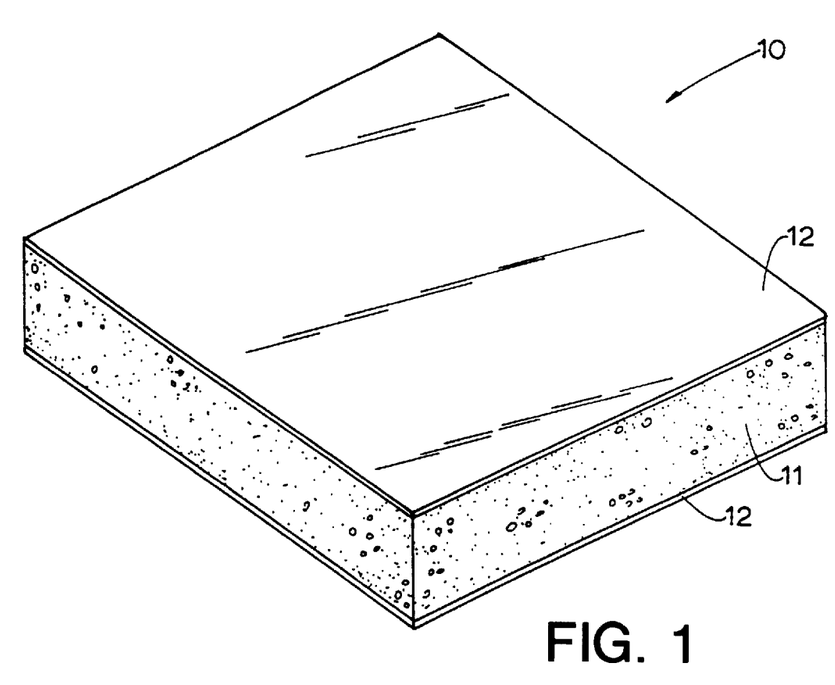
FIG. 1 shows a portion of a panel in accordance with the invention.
Figure 2:
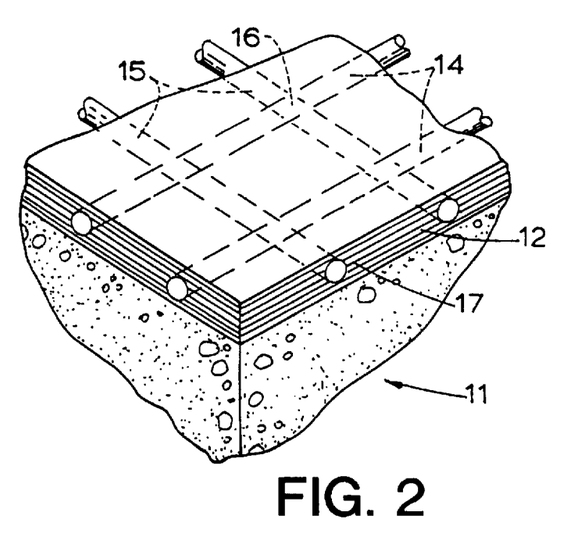
FIG. 2 shows detail A of FIG. 1.
Figure 3:
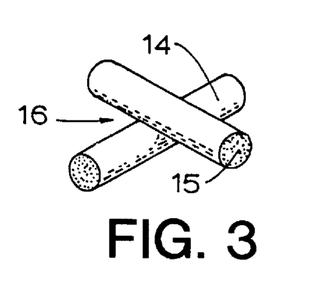
FIG. 3 shows detail B of FIG. 2.

Referring to FIG. 1, a panel 10 includes a core 11 and, on each surface of the core 11, a cladding layer 12. In the detail shown in FIG. 2, the cladding layer 12 includes a textile fabric 16 having warp fibres 14 laid across weft fibres 15 at substantially 90° and embedded within a coating material 17. Referring to FIG. 3, the weft fibres 15 are aligned on top of the warp fibres 14. However, it will be appreciated that the warp fibres 14 may be provided above the weft fibres 15, or even a woven pattern between the warp fibres 14 and the weft fibres 15 may be provided.

Figure 4:
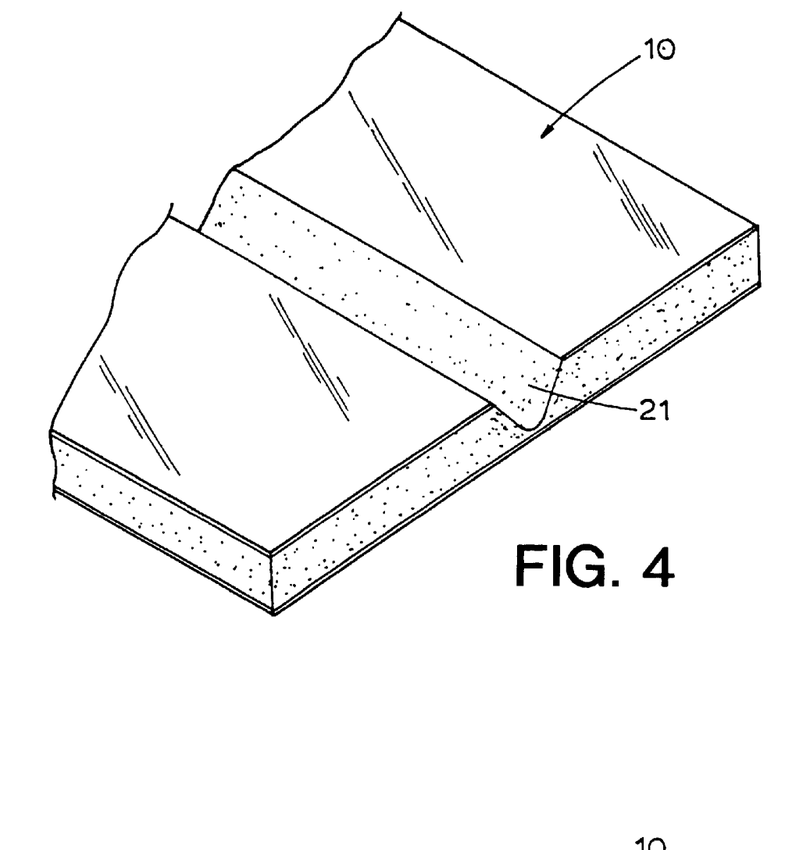
FIG. 4 shows diagrammatically a groove for a fold in a sheet in accordance with the present invention.
Figure 5:
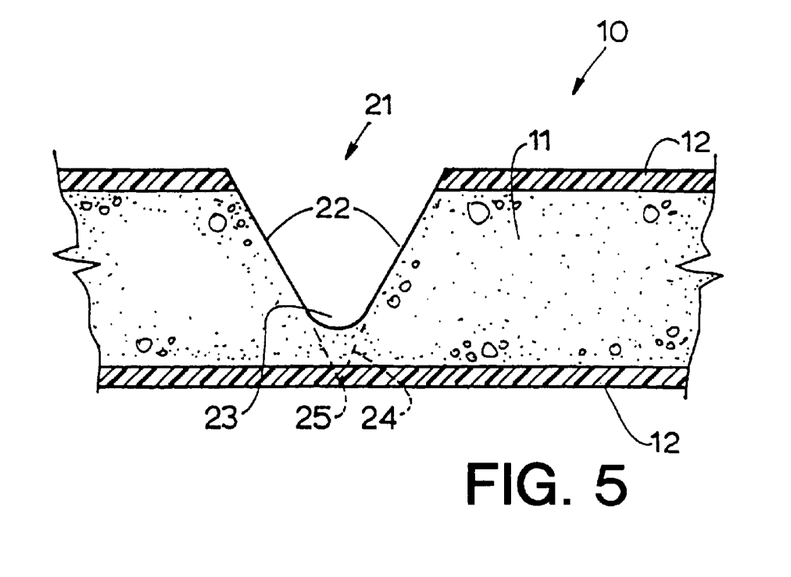
FIG. 5 shows detail C of FIG. 4.

Referring to FIG. 4, the panel 10 is provided with a V-shaped cut 21 as shown. Referring to detail C as shown in FIG. 5, the V-shaped cut 21 includes two sloping sides 22 which, if projected as shown by respective projected sidelines 24, would intersect at an intersection point 25. But instead, the V-shaped cut 21 curves at the base around a curved base 23 as shown.

Figure 6:
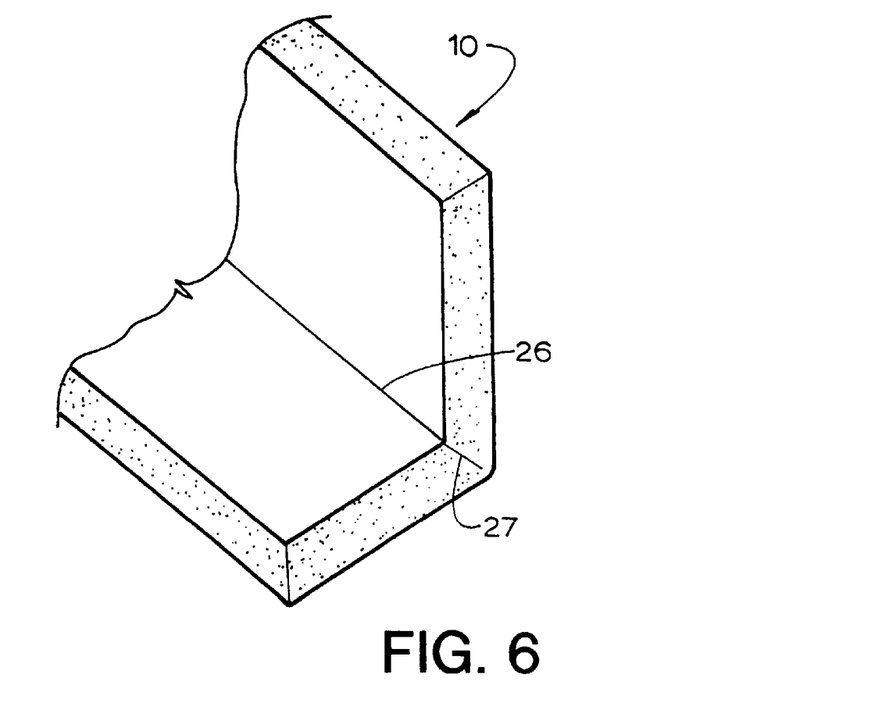
FIG. 6 shows the panel of FIGS. 4 and 5 when folded.
Figure 7:
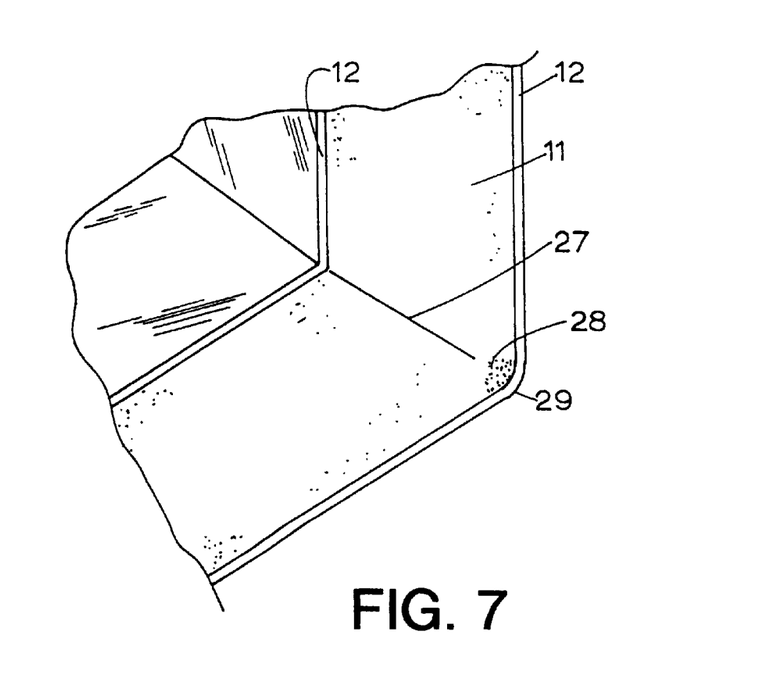
FIG. 7 shows detail D of FIG. 6.

Referring to FIG. 6, the panel 10 includes a fold 26 where the sides 22 of the V-shaped cut 21 are brought together to form a cleavage line 27. Referring to FIG. 7, the cleavage line 27 ends short of the fold in the panel 10 where one of the cladding layers 12 ends short of a cladding bend 29 and the core 11 is compressed around a compression area 28.

Figure 8:
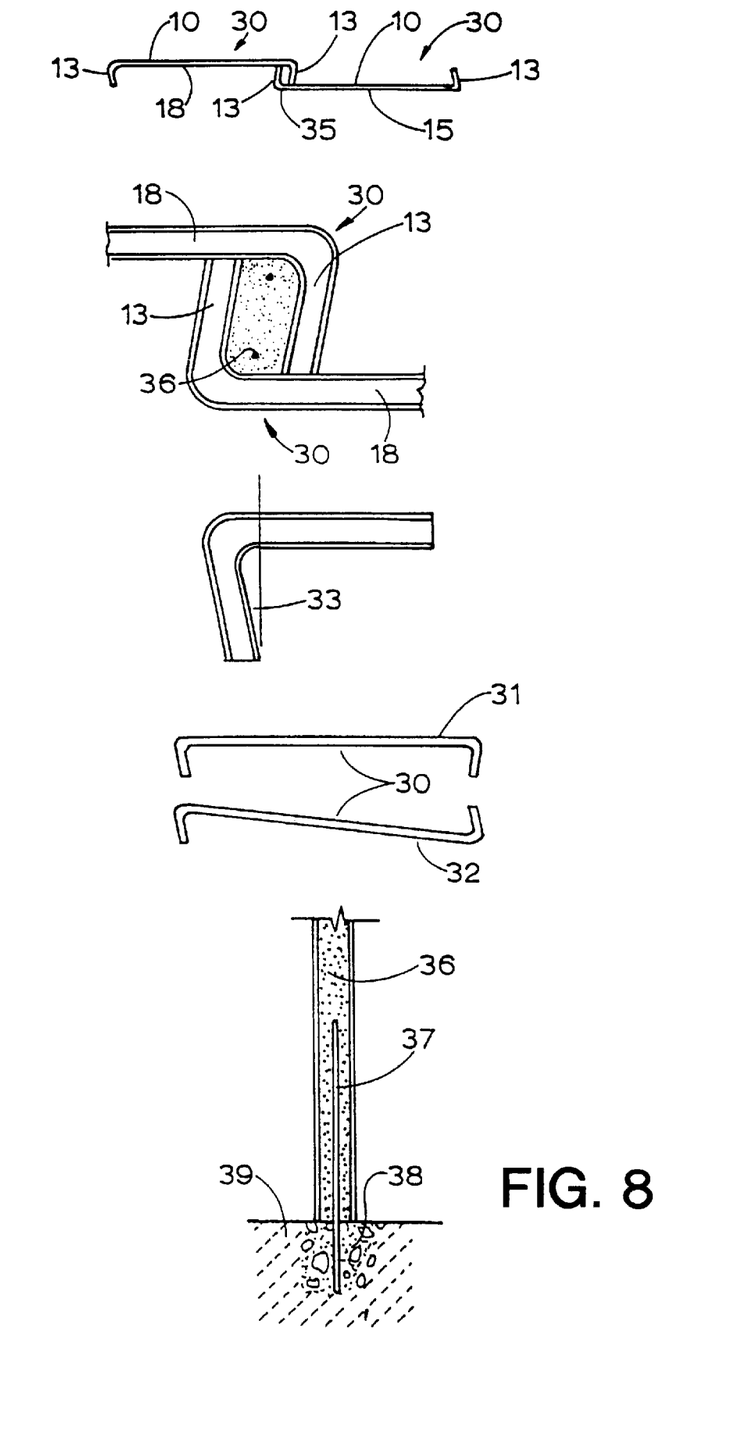
FIG. 8 shows collectively and diagrammatically the arrangements of a panel with hooked flanges.

Referring to FIG. 8, the panels 10 may be hooked panels 30 which include a plane body portion 18 and respective hooked flanges 13 extending along each vertical end of the hooked panels 30. The hooked panels 30 may be provided in either a U-form profile as shown at 31 or a Z-form profile as shown at 32. The hooked flanges are provided at a flange angle 33 of preferably 10°.

The hooked panels 30 are provided with a gap 35 between adjoining panels, but with the edges of the flanges 13 hard up against the plane body portion 18 so that a settable liquid may be poured into the gap 35 to provide a pier 36 with a reinforcing 37 extending into a footing 38 set into a foundation 39.

Figure 9:
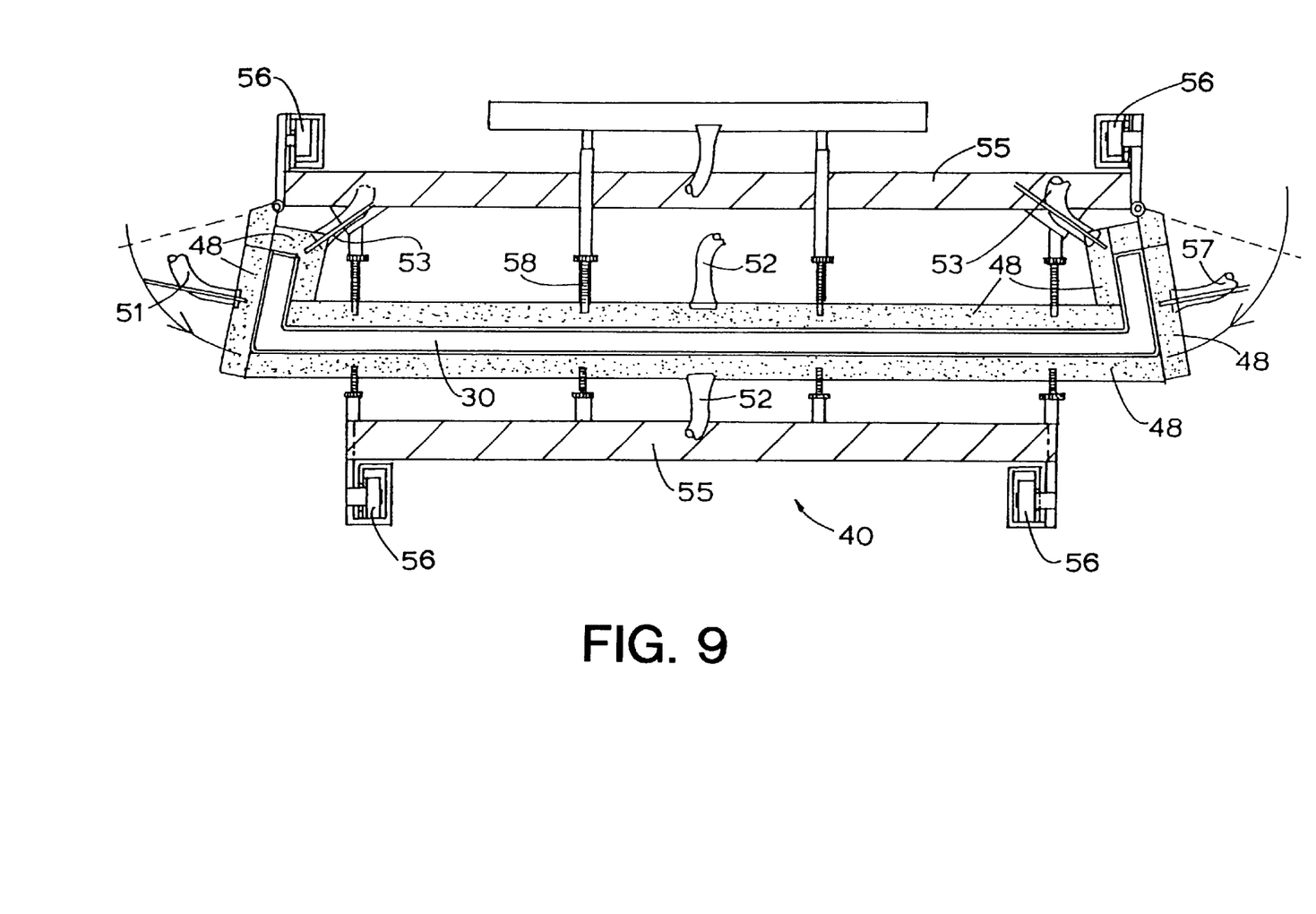
FIGS. 9 and 10 show diagrammatically a doctor blade assembly.
Figure 10:
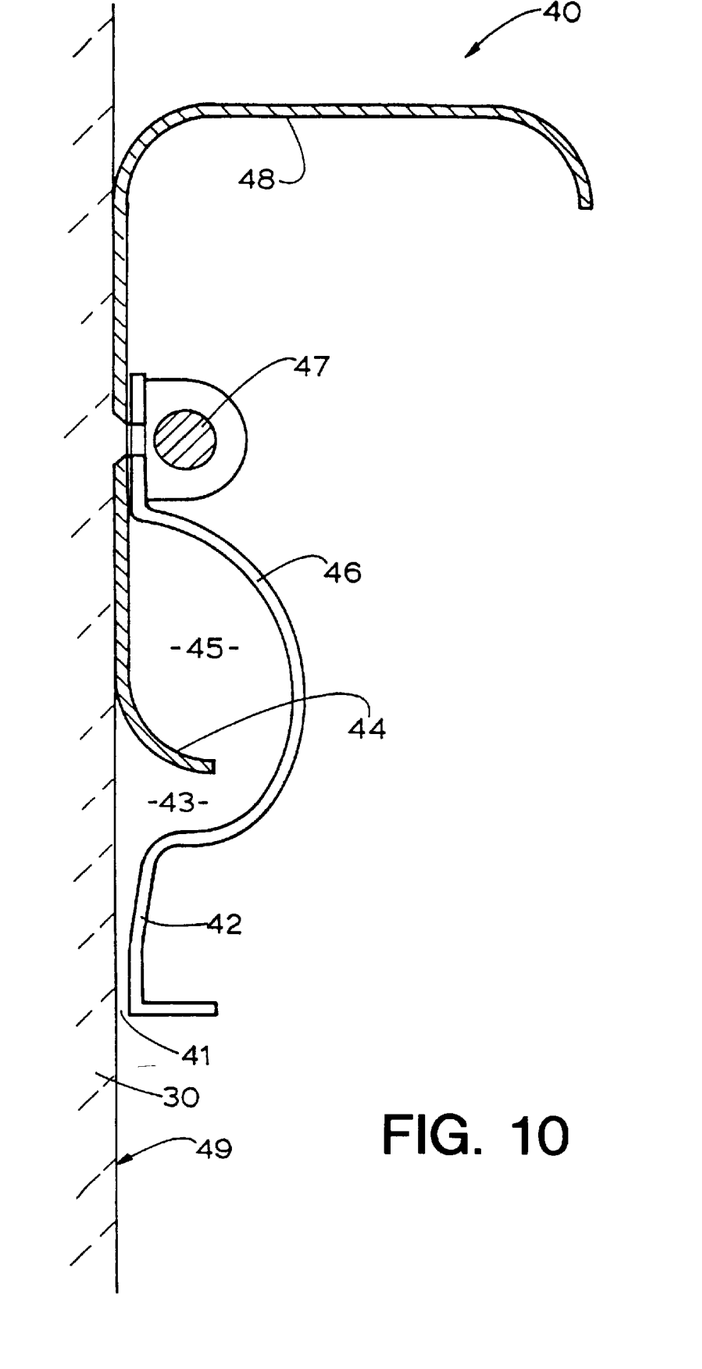

Referring to FIGS. 9 and 10, a doctor blade assembly 40 is suspended by a blade support 55 and guided for vertical motion by four guide rollers 56. The doctor blade assembly 40 include a leading portion 48 in hinged connection with a supply portion 46 which is bulbous in section and elongate in the horizontal direction. A flow guide 44 curves inwardly towards the supply portion 46 to provide a delivery plenum 45 extending the length of the doctor blade assembly 40.

The flow guide ends short of the supply portion 46 to provide a delivery gap 43 extending the length of the doctor blade assembly 40. A trailing portion 42 ends away from the surface 49 being coated, with a clearance 41 causing settable liquid introduced into the plenum 45 to be distributed evenly across the surface 49.

The delivery plenum 45 is provided with supply lines shown at 51, 52 and 53 in FIG. 9, and the delivery gap 43 tapers or changes its dimensions to produce an even distribution of the settable liquid as it is extruded. As can be seen in FIG. 9, the doctor blade assembly is provided in a profile which surrounds the hooked panels 30 as to coat them completely. The doctor blade assembly 40 is held against the surface 49 of the panel 30 by a set of spring loaded clamps shown typically at 58 such that the textile fabric 16 end up substantially centrally placed across the thickness of the settable liquid.

Figure 11:
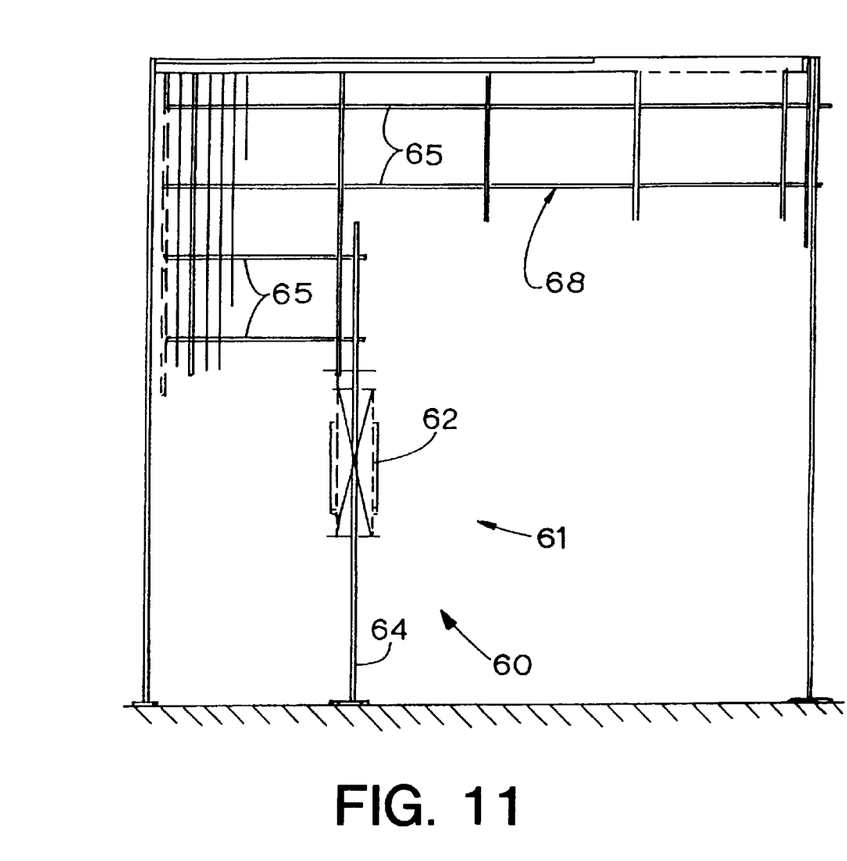
FIG. 11 shows diagrammatically the coating of a panel in plan view.
Figures 12, 13:
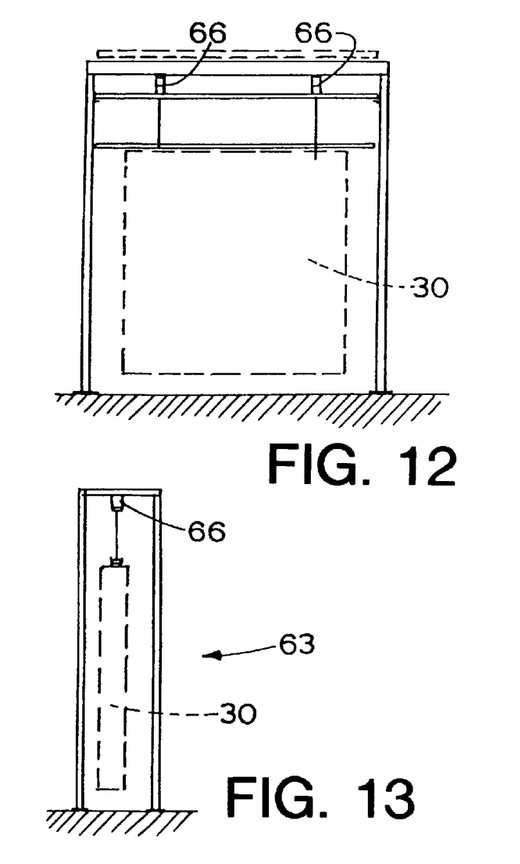
FIG. 12 shows a section of FIG. 11 on B—B.
FIG. 13 shows a section of FIG. 11 on A—A.

Referring to FIGS. 11, 12 and 13, a coating assembly line 60 includes a coating machine 62. The panel coated is suspended from a guide track 64, and moved by a pair of trolley assemblies 66 operable on the guide track. Transverse tracks 65 are provided for movement of the panel at right angles to the guide track 64. After coating on the coating machine 62, the panels 30 are suspended while the settable liquid sets in a drying area shown at 68.

Figure 14:
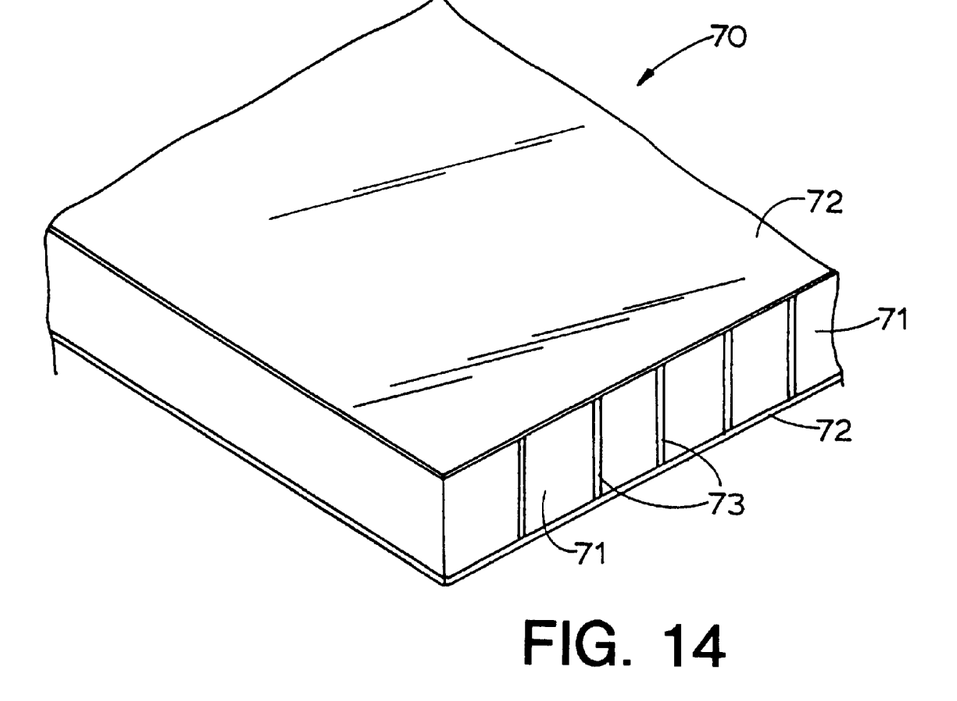
FIG. 14 shows a portion of an alternative panel in accordance with the invention.
Figure 15:
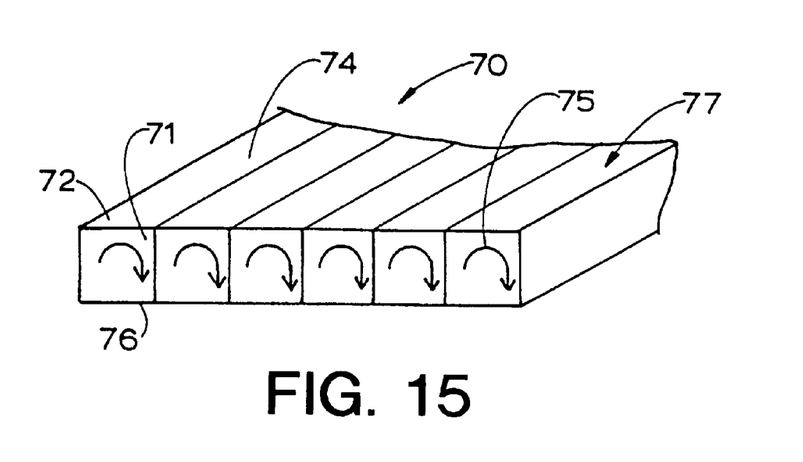
FIG. 15 is a diagrammatic view of the construction of the panel of FIG. 14.

Referring to FIGS. 14 and 15, an alternative panel 70 includes core bodies shown typically at 71 interposed between two cladding layers 72 bonded onto each side of the core bodies 71, and respective webs shown typically at 73 extending between the cladding layers 71 and bonded thereto along their respective outer edges.

Referring particularly to FIG. 15, the alternative panel 70 is formed by first providing a cladding layer 72 on one side of the core body 71, then slitting the core body 71 along substantially parallel slit lines shown typically at 74 to form respective slit members shown typically at 77. The longitudinal corners of the slit members 77 are rounded or chamfered and the slit members 77 are then turned about their respective longitudinal axes in the direction of an arrow shown typically at 75 until the cladding layer 72 applied to the core body 71 is interposed between successive adjoining slit members 77 to form the webs 73.

Two further cladding layers 72 are added, bonding to the slit members 77 and the webs 73, embedding into the rounded or chambered corners to give greater strength to the bond between the webs 73 and the cladding layers 72.

In use, a panel of the present invention may be used to construct such parts of a building requiring panelling. Where a corner is required, the panel may be folded as described above.

The panel is formed by providing the core 11 in sheet form and applying the cladding layer 12 as described above. Firstly, a layer of settable material is applied to the surface, and before is sets, a layer of textile fabric is applied to the wet settable liquid. Before, during, or after drying, more settable material is added to encapsulate the textile material in the cladding.

To fold the panel 10, a cut is made as described above. The cut may be made by a sharp implement such as a knife or such like, but preferably, a rotary cutter is assembled to form the V-shaped cut. The V-shaped cut may be used as a gap to accommodate the folding of the panel 10 about the cladding bend 29, the structural integrity of the folded panel being enhanced by bonding the cut cladding layer 12 along the sides 22 of the cut 21.

In providing retaining walls, sound barriers, fencing or such like, a footing may be prepared with reinforcing bars extending upwardly therefrom at intervals suitable for providing piers between adjoining hooked panels 30 according to the invention. The panels are placed with their respective flanges around the reinforcing bars, and clamped together to prevent liquid concrete from leaking out between adjoining panels when poured into the gap 35 between the panels. The piers are not normally required the full height of the panels, and the gap may be filled with more concrete, or other filler as desired. Soil may be used as a filler and suitable plants introduced for beautifying the wall when completed.

The alternative panel having webs interconnecting the cladding layers is believed to be of sufficient structure with the core means removed. Due to fire or excessive heat, the core means may melt or decompose, leaving the webs as the means of separating the spaced cladding layers and holding the alternative panel in its shape. Fire foaming surface coatings may be applied to the panels of the present invention to enhance there fire protection rating.

It will of course be realised that while the above has been given by way of illustrative example of this invention, all such and other modifications and variations thereto as would be apparent to persons skilled in the art are deemed to fall within the broad scope and ambit of this invention as claimed in the following claims.

What is claimed is:

1. A building panel including:

a compressible core formed from a polymer foam;

cladding on at least one outer surface of said core comprising a patterned open mesh component and a resin component, the resin component being bonded to the mesh and to the core, and wherein the cladding is substantially more rigid than said core for imparting strength thereto.

2. A building panel as claimed in claim 1, wherein said polymer foam is polystyrene foam.

3. A building panel as claimed in claim 1, wherein said core is constructed from sheets of corrugated cardboard with corrugations running across the thickness of said panels.

4. A building panel as claimed in claim 1, wherein said patterned open mesh component is a patterned open mesh textile component.

5. A building panel as claimed in claim 4, wherein said resin component includes a settable liquid applied to said outer surface and set into interstices of said textile component.

6. A building panel according to claim 1, wherein cladding is applied on at least two opposing sides of said core.

7. A building panel as claimed in claim 6, wherein said textile component includes a fibreglass mesh formed into a non-woven square grid pattern of 4 mm or 5 mm and having a density of 165 g/m$^2$ or 150 g/m$^2$ respectively.

8. A building panel as claimed in claim 7, wherein said settable liquid includes a two-part acrylic.

9. A building panel including:

a substantially lightweight core;

cladding means containing a patterned open textile mesh and a resin disposed around and within a plurality of interstices of said mesh, the resin component bonding to the mesh and to the core.

10. A building panel as claimed in claim 9, wherein a crease is formed in one of two opposing sides of said panel, the crease facilitating folding of the panel thereby forming a fold.

11. A building panel according to claim 10, wherein said panel is folded about the crease.

12. A building panel according to claim 11, wherein said core is compressed in an area within said fold, and where cladding means on an inner side of said fold is creased into said fold.

13. A building panel according to claim 9, including a flange on each end of said panel such that said panel in cross-section is in U-form, whereby two or more of said panels may be stood up to end-to-end configuration with adjoining panels hooking together at their respective flanges.

14. A building panel according to claim 9, including a flange on each end of said panel such that said panel in cross-section is in Z-form, whereby two or more of said panels may be stood up in end-to-end configuration with adjoining panels hooking together at their respective flanges.

15. A first building panel as claimed in claim 14, in combination with a second building panel as claimed in claim 14, said first and second panels arranged so that upon hooking one panel together with another panel, by means of respective flanges, a gap is provided between said hooked together flanges suitable for placement of a pier.

16. A hinged connection formed into a building panel as claimed in claim 9.

17. A method of forming a building panel, said method including the steps of:

providing core means containing a compressible solid;

forming said core means into a desired configuration;

setting an open mesh textile sheet onto the surface of the core means;

applying a settable liquid to the surface of the core means to substantially encapsulate said textile sheet to form a cladding layer on one or both surfaces of the core means.

18. A method as claimed in claim 17, further including the step of applying a coating of settable liquid on to said surface of the core means prior to the step of setting the open mesh textile sheet onto said surface.

19. A building panel as claimed in claim 4, wherein said open mesh textile component is woven.

* * * * *